United States Patent
Farrar et al.

(10) Patent No.: US 7,541,081 B2
(45) Date of Patent: Jun. 2, 2009

(54) PHASE CHANGE MEMORY FOR ARCHIVAL DATA STORAGE

(75) Inventors: Paul A. Farrar, Bluffton, SC (US); Leonard Forbes, Corvallis, OR (US); Alan R. Reinberg, Cheshire, CT (US)

(73) Assignee: Micron Technology, Inc., Boise, ID (US)

( * ) Notice: Subject to any disclaimer, the term of this patent is extended or adjusted under 35 U.S.C. 154(b) by 565 days.

(21) Appl. No.: 11/190,014

(22) Filed: Jul. 27, 2005

(65) Prior Publication Data
US 2007/0003732 A1 Jan. 4, 2007

Related U.S. Application Data

(63) Continuation-in-part of application No. 11/168,317, filed on Jun. 29, 2005.

(51) Int. Cl.
*B32B 3/02* (2006.01)
(52) U.S. Cl. .................... 428/64.4; 430/270.12
(58) Field of Classification Search ............... 428/64.1, 428/64.4; 430/270.12
See application file for complete search history.

(56) References Cited

U.S. PATENT DOCUMENTS

| | | | |
|---|---|---|---|
| 4,461,807 A * | 7/1984 | Mori et al. | 428/469 |
| 4,499,178 A | 2/1985 | Wada et al. | |
| 4,772,897 A * | 9/1988 | Ohkawa | 346/135.1 |
| 4,816,841 A * | 3/1989 | Kobayashi et al. | 369/284 |
| 5,458,941 A * | 10/1995 | Hintz | 428/64.4 |
| 5,796,708 A * | 8/1998 | Ohkawa et al. | 369/283 |
| 6,033,752 A * | 3/2000 | Suzuki et al. | 428/64.1 |
| 2005/0047306 A1* | 3/2005 | Inoue et al. | 369/94 |
| 2005/0164040 A1* | 7/2005 | Yoshitoku et al. | 428/694 XS |
| 2005/0213477 A1* | 9/2005 | Kato et al. | 369/174 |
| 2008/0063848 A1* | 3/2008 | Chang et al. | 428/215 |

FOREIGN PATENT DOCUMENTS

| | | | |
|---|---|---|---|
| EP | 1 457 977 A1 | | 9/2004 |
| JP | 60-171236 | * | 6/1994 |
| JP | 2000/285509 | | 10/2000 |

(Continued)

OTHER PUBLICATIONS

Grigorievl et al., "Phase Diagrams Solid Surface (AuSi Sample) Studied by SEM and Photoluminescence", APS User's Meeting 2004, NSLS User's Meeting 2004.

(Continued)

*Primary Examiner*—Elizabeth Mulvaney
(74) *Attorney, Agent, or Firm*—Dickstein Shapiro LLP

(57) ABSTRACT

A structure for storing digital data is provided, with a high reflectance layer comprising a noble metal formed over an underlying material layer, and a plurality of low reflectance portions comprising a mixture of a noble metal and an underlying material. The plurality of low reflectance portions have top surfaces comprising a compound of the underlying and the noble metal. A method of changing reflectance on a data storage disk is also disclosed. The method comprises the acts of irradiating a laser light beam onto a noble metal formed over an underlying layer, and raising the temperature of the noble metal above the melting temperature forming a compound of the noble metal and the underlying material.

51 Claims, 14 Drawing Sheets

FOREIGN PATENT DOCUMENTS

JP         2003/200663         7/2003

OTHER PUBLICATIONS

Brillson et al., "Photoemission Studies of Atomic Redistribution at Gold-Silicon and Aluminum-Silicon Interfaces", Journal of Vacuum Science & Technology, A: Vacuum, Surfaces, and Films, vol. 2, Issue 2, pp. 551-555, Apr. 1984.

Bokhonov et al., "In Situ Investigation of Stage of the Formation of Eutectic Alloys in Si-Au and Si-Al Systems", Journal of Alloys and Compounds 312, p. 238, 2000.

Tiensuu et al., "Assembling Three-Dimensional Microstructures Using Gold-Silicon Eutectic Bonding", Sensors and Actuators A 45, p. 227, 1994.

Muemmler et al., "Ellipsometrical Studies on the Au/Si (111) System", Thin Solid Films 317, p. 193, 1998.

Zhimov et al., "Field Emission Properties of Au-Si Eutectic", Applied Surface Science 144, pp. 94-95, 1996.

Wolffenbuttel et al., "Low-Temperature Silicon Wafer-to-Wafer Bonding Using Gold at Eutectic Temperature", Sensors and Actuators A 43, p. 223-29, 1994.

Waghorne et al., "Structure of Liquid Alloys of the Au-Si and Au-Ge Systems", Journal of Physics F :Metal Physics, vol. 6, No. 2, p. 147, 1976.

Kennedy et al., "Au-Si Eutectic Alloy Formation by Si Implantation in Polycrystalline Au", Nuclear Instruments & Methods in Physics Research, Section B (Beam Interactions with Materials and Atoms) 171, p. 325, 2000.

Naidich et al., "The Wettability of Silicon Carbide by Au-Si Alloys", Materials Science and Engineering A245, p. 293, 1998.

Brueggemann et al, "Electrical and Optical Properties of Melting Au/Si Eutectics on Si (111)", Fresenius' Journal of Analytical Chemistry, 358, p. 179-81, 1997.

Cheng et al., "Localized Silicon Fusion and Eutectic Bonding for MEMS Fabrication and Packaging", Journal of Microelectromechanical Systems, vol. 9, No. 1, p. 3, 2000.

Demortier et al., "3D Characterization of the Eutectic Au-Si Alloy by Using a Nuclear Microprobe", Scanning, 13, p. 350, 1991.

Anantatmula et al., "The Gold-Silicon Phase Diagram", Journal of Electronic Materials, vol. 4, No. 3, p. 445, 1975.

Kato, "Eutectic Reactions and Textures of Au-Si Alloy Films on Single-Crystal Silicon", Japanese Journal of Applied Physics, Part 1 (Regular Papers and Short Notes), vol. 28, No. 6, p. 953-56, 1989.

Mencinger et al., "Use of Wetting Angle Measurements in Reliability Evaluations of Au-Si Eutectic Die Attach", 23 Annual Proceedings Reliability Physics 1985 (IEEE Cat. No. 85CH2113-9), p. 173, 1985.

Tu et al., "Wetting of Quartz Surfaces by Au-Si Eutectic Melt (MOS Structures)", Journal of Applied Physics, vol. 48, No. 1, p. 420, 1977.

Johnson et al., "Determination of the Solubility of Silicon in Gold and the Gold-Silicon Eutectic Composition Using a New Quantitative Metallographic Technique", Scripta Metallurgica 21, p. 1689-92, 1987.

Dutchak et al., "Character of the Atomic Ordering in Eutectic Au-Si and Al-Si Alloys", Soviet Physics Journal, p. 122, 1975.

Johnson et al., "Surface Cracking in Gold-Silicon Alloys", Solid-State Electronics, vol. 21, No. 12, p. 1107-09, 1984.

Dutchak et al., "X-ray Investigation of Some Eutectic Alloys in the Liquid State", Acta Crystallographica, Section A (Crystal Physics, Deffraction, Theoretical and General Crystallography), A28, S127, 1972.

Hafner, "Even Digital Memories Can Fade", New York Times, Nov. 10, 2004, http://www.nytimes.com/2004/11/10/technology/10archive.html?ex=1101100029&ei=1&en=d5005d5423e465d5.

Moller et al., "A Polymer/Semiconductor Write-Once Read-Many-Times Memory", Nature, vol. 426, No. 6963, pp. 166-169, Nov. 13, 2003.

Kalbitzer, "Novel Concepts for Mass Storage of Archival Data", Nuclear Instruments & Methods in Physics Research, Section B (Beam Interactions with Materials and Atoms), vol. 218, Jun. 2004, pp. 343-354, Twelfth International Conference on Radiation Effects in Insulators, Gramado, Brazil, Aug. 31-Sep. 5, 2003.

Chang et al., Transmission Electron Microscopy of Gold-Silicon Interactions on the Backside of Silicon Wafers, Journal of Applied Physics 63(5), pp. 1473-1477, Mar. 1, 1998.

Grigoriev et al., "Surface Structure Study of Liquid Eutectic Alloys: AuSi and AuGe", presented at APS users meeting, Argonne National Laboratory, May 2004.

Huber et al., "Optical properties of laser-melt-quenched Au-Si alloys", Phys. Rev. B28, 2979-2984 (1983), Issue 6, Sep. 15, 1983, © 1983 American Physical Society.

* cited by examiner

| UNDERLYING MATERIAL | NOBLE METAL | | | | | | | |
|---|---|---|---|---|---|---|---|---|
| | Pt | Au | Ir | Os | Re | Pd | Ru | Rh |
| Ti | X | X | X | X | X | X | X | X |
| ZR | X | X | X | X | X | X | X | X |
| Hf |   | X | X | X | X | X | X | X |
| V | X | X | X | X |   | X | X | X |
| Si | X |   | X | X | X | X | X | X |
| Ge | X |   |   |   | X | X | X | X |
| Nb | X | X | X | X | X | X | X | X |
| Ta | X | X | X | X | X | X | X | X |
| CR | X |   | X | X | X | X | X | X |

FIG. 15

PHASE CHANGE MEMORY FOR ARCHIVAL DATA STORAGE

CROSS-REFERENCE TO RELATED APPLICATIONS

This application is a continuation-in-part of application Ser. No. 11/168,317, filed on Jun. 29, 2005, titled Gold-Semiconductor Phase Change Memory For Archival Data Storage, the entire disclosure of which is incorporated by reference herein.

FIELD OF THE INVENTION

The invention relates generally to archival data storage on optical disks, and more particularly to using novel materials that provide greater long-term stability to the stored data.

BACKGROUND OF THE INVENTION

Personal computer users, businesses, and public offices are faced with a deluge of data in the form of digital information. The question of how to preserve this data for the next decade, and for the ages, has yet to be answered. The most common data backup includes storing the data on a writable compact disk CD, CD-R (compact disk, write once read-only memory), CD-ROM (compact disk, read-only-memory), or a CD-RW, short for CD-ReWritable disk. A CD-ROM is an adaptation of the CD and is designed to store data in the form of text and graphics, as well as sound. A CD-RW is a type of CD disk that enables a user to write onto the disk multiple times. A CD-R comprises an organic layer sandwiched between a transparent base and a reflective layer. When heated by a focused laser, the dye layer melts and forms a series of pits, which are readable by a laser beam as 0's and 1's.

The technology behind a CD-RW is known as optical phase-change, an optical storage technology in which data is written with a laser that changes dots on the disk between amorphous and crystalline states. Phase change is a type of CD recording technology that enables the disks to be written, erased, and rewritten through the use of a layer of a special material for the recording layer—the phase change layer—that can be changed repeatedly from an amorphous (formless) to a crystalline state. The crystalline areas allow the metalized layer to reflect the laser beam better, while the non-crystalline portion absorbs the laser beam, so the beam is not reflected. An optical head reads data by detecting the difference in reflected light from amorphous and crystalline dots.

During writing, a focused laser beam selectively heats areas of the phase-change material above the melting temperature, so all the atoms in this area can rapidly rearrange. The recording phase-change layer is sandwiched between dielectric layers that draw excess heat from the phase-change layer during the writing process. Then, if cooled sufficiently quickly, the random state is "frozen-in," and the so-called amorphous state is obtained. The amorphous version of the material has different reflection properties where the laser dot was written, resulting in a recognizable CD surface. Writing takes place in a single pass of the focused laser beam, which is referred to as "direct overwriting," and can be repeated several thousand times per disk. Once the data has been burned, the amorphous areas reflect less light, enabling a "Read Power" laser beam to detect the difference between the lands and the pits on the disk. The recorded tracks on a CD-RW disk are read in the same way as regular CD tracks. That is, by detecting transitions between low and high reflectance, and measuring the length of the periods between the transitions. The only difference is that the reflectance is lower than for regular CDs.

A digital versatile disk (DVD) provides an optical disk technology that allows for much greater storage as compared with CDs. With reference to FIGS. 1 and 2, a DVD's sevenfold increase in-data capacity over the CD has been largely achieved by tightening the tolerances throughout the predecessor CD system. The tracks on the DVD are placed closer together, thereby allowing more tracks per disk than found on CDs. As shown in FIG. 2, the DVD track pitch 4 is reduced to 0.74 microns, less than half of CD's 1.6 micron track pitch 2, as shown in FIG. 1. The pits 6, in which the data is stored, are also a lot smaller, allowing more pits per track. The minimum pit length 10 of a single layer DVD is 0.4 microns, as compared to 0.83 microns pit length 8 for a CD. With the number of pits having a direct bearing on capacity levels, the DVD's reduced track pitch and pit size alone give DVD ROM disks four times the storage capacity of CDs. The packing of as many pits as possible onto a disk is, however, the simple part. The real technological breakthrough of the DVD was with its laser. Smaller pits mean that the laser has to produce a smaller spot, and the DVD achieves this by reducing the laser's wavelength from the 780 nanometers infrared light of a standard CD, to 635 nm or 650 nm red light.

The first-generation CD players used a 780 nm AlGaAs laser diode developed in the early 1980s. With this technology, a CD-ROM stored about 650 Mbytes of information. The shortest wavelength commercially-viable device that was made in this system was about 750 nm. Further shortening of the wavelength called for a different material, and in the late 1980s red-emitting laser diodes were developed in the AlGaInP system, grown lattice-matched on a GaAs substrate. This material has provided the laser for new DVDs, which store about 4.7 Gbytes of information. Different materials are used to make a laser emit blue light, e.g., at wavelengths in the range of 430 nm to 480 nm. One technique reported has been laser action at 77K from a GaN-based device by researchers at Nichia Chemical Industries in Japan. Nichia announced pulsed room temperature operation at the end of 1995, and continuous operation in early 1997. By August 1997 the room temperature operating life had reached 300 hours. Based on accelerated life-testing at elevated temperatures, Nichia reported in 1999 a room temperature operating life of about 10000 hours at room temperature. A wide variety of solid state laser diodes are now available for use in CD-ROM or CD-ROM like technology.

While current optical disk technologies such as DVD, DVD±R, DVD±RW, and DVD-RAM use a red laser to read and write data, a new format uses a blue-violet laser, sometimes referred to as Blu-ray. The benefit of using a blue-violet laser (405 nm) is that it has a shorter wavelength than a red laser (650 nm), which makes it possible to focus the laser spot with even greater precision. This allows data to be packed more tightly and stored in less space, so it is possible to fit more data on the disk even though it is the same size as a CD or DVD. This together with the change of numerical aperture to 0.85 is what enables Blu-ray Disks to hold 25 GB. Blu-ray technology should become available in the 2005 to 2006 time frame. Some new techniques proposed for archival storage have included "a polymer/semiconductor write-once read-many-times memory" and some "novel concepts for mass storage of archival data" using energetic beams of heavy ions to produce radiation damage in thin layers of insulators.

Current CD-ROM memories based on changes in organic dyes or phase changes in layers may degrade over time and become unreadable. Although at normal temperature and humidity the life span of CD could be in excess of 100 years, the life span of data on a CD recorded with a CD burner could be as little as five years if it is exposed to extremes in humidity or temperature. And, if an unprotected CD is scratched it can become unusable. What is needed is a data storage medium that can provide greater long-term stability for the stored data.

BRIEF SUMMARY OF THE INVENTION

The invention relates to a writable optical data storage medium with good long term stability. The data storage medium, which can be a disk, for example, comprises a substrate having a dielectric layer formed thereon, an underlying material layer formed over the dielectric layer, and a noble metal layer formed over the underlying material layer. A protective layer may be formed over the noble metal layer.

Data can be written onto the medium by a laser which causes formation of a mixed material portion in the noble metal layer and the underlying material layer. The mixed material portions of the medium have a lower reflectivity than other portions of the medium having the undisturbed noble metal layer, enabling the medium to be read.

The invention also relates to a system for writing data and reading data from an optical data storage medium. The system comprises a device capable of irradiating a laser beam onto a medium, which has a substrate with a first dielectric layer, an underlying material layer formed over the first dielectric layer, and a noble metal layer formed over the underlying material layer. The invention provides a writing laser beam capable of forming mixed material portions, e.g., inter-metallic compounds, on the medium, which contain both noble metal and underlying material. The system also provides a reading laser beam that can read data from the medium.

The invention also relates to a method of changing reflectance of selected areas on a data storage medium, comprising the acts of irradiating a laser light beam onto a noble metal formed over an underlying material layer to raise the temperature of the noble metal above its melting temperature causing the creation of a compound containing the noble metal and the underlying material layer. The invention also provides a recorded optical medium that has a support structure, a first material layer formed over the support structure, and a second light reflective material layer formed over the first material layer. The second light reflective material has a first light reflectance property. The first and second material layers have a property such that a light beam applied to a region of the second material layer heats the first and second material layers and causes a mixture of materials from the first and second material layers, and also causes a second light reflectance property for the region which is different from the first light reflectance property.

BRIEF DESCRIPTION OF THE DRAWINGS

These and other features of the present invention will be apparent from the following detailed description and drawings which illustrate preferred embodiments of the invention, in which:

FIG. 15 is table showing combinations of materials used in the invention.

DETAILED DESCRIPTION OF THE INVENTION

In the following detailed description, reference is made to the accompanying Figures, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and other changes may be made without departing from the spirit and scope of the present invention.

The invention relates to an archival storage medium, and is based on a reflectance change between a reflective metal portion of the medium and a mixed noble metal material and underlying material portion of the medium. In particular, the invention relates to an archival storage medium based on a noble metal layer forming a compound with an underlying material layer. Noble metals are metals, or metal alloys, that are highly resistant to oxidation and corrosion. According to the invention, the noble metal layer is selected from the following group of noble metals: Gold (Au), Iridium (Ir), Osmium (Os), Palladium (Pd), Platinum (Pt), Rhenium (Re), Rhodium (Rh) and Ruthenium (Ru). It is preferable that the noble metal layer comprises one noble metal. However, the noble metal layer can also comprise an alloy of more than one metal, or an alloy comprising at least one member selected from the group consisting of Au, Ir, Os, Pd, Pt, Re, Rh and Ru. The underlying material layer can be a metal selected from the following group of underlying materials: Chromium (Cr), Hafnium (Hf), Niobium (Nb), Tantalum (Ta), Titanium (Ti), Zirconium (Zr) and Vanadium (V). It is preferable that the underlying material layer comprises one metal. However, the underlying material layer can also comprise an alloy of more that one metal, or an alloy comprising at least one member selected from the group consisting of Cr, Hf, Nb, Ta, Ti, Zr and V. The underlying material can also be a semiconductor material layer selected from the following group: Silicon (Si) and Germanium (Ge).

Figure 1:
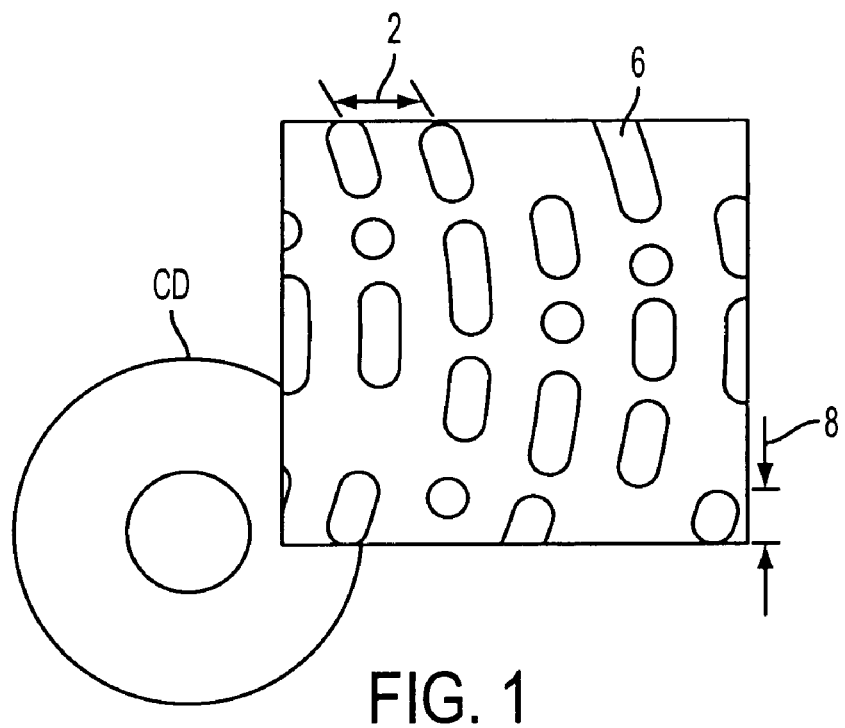
FIG. 1 shows data storage characteristics of a typical CD.
Figure 2:
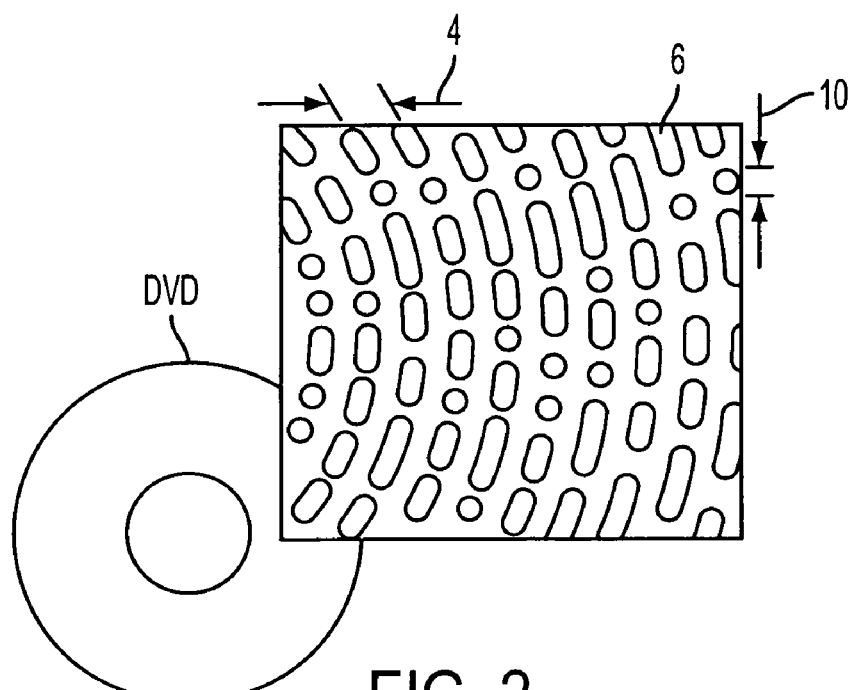
FIG. 2 shows data storage characteristics of a typical DVD.
Figure 3:
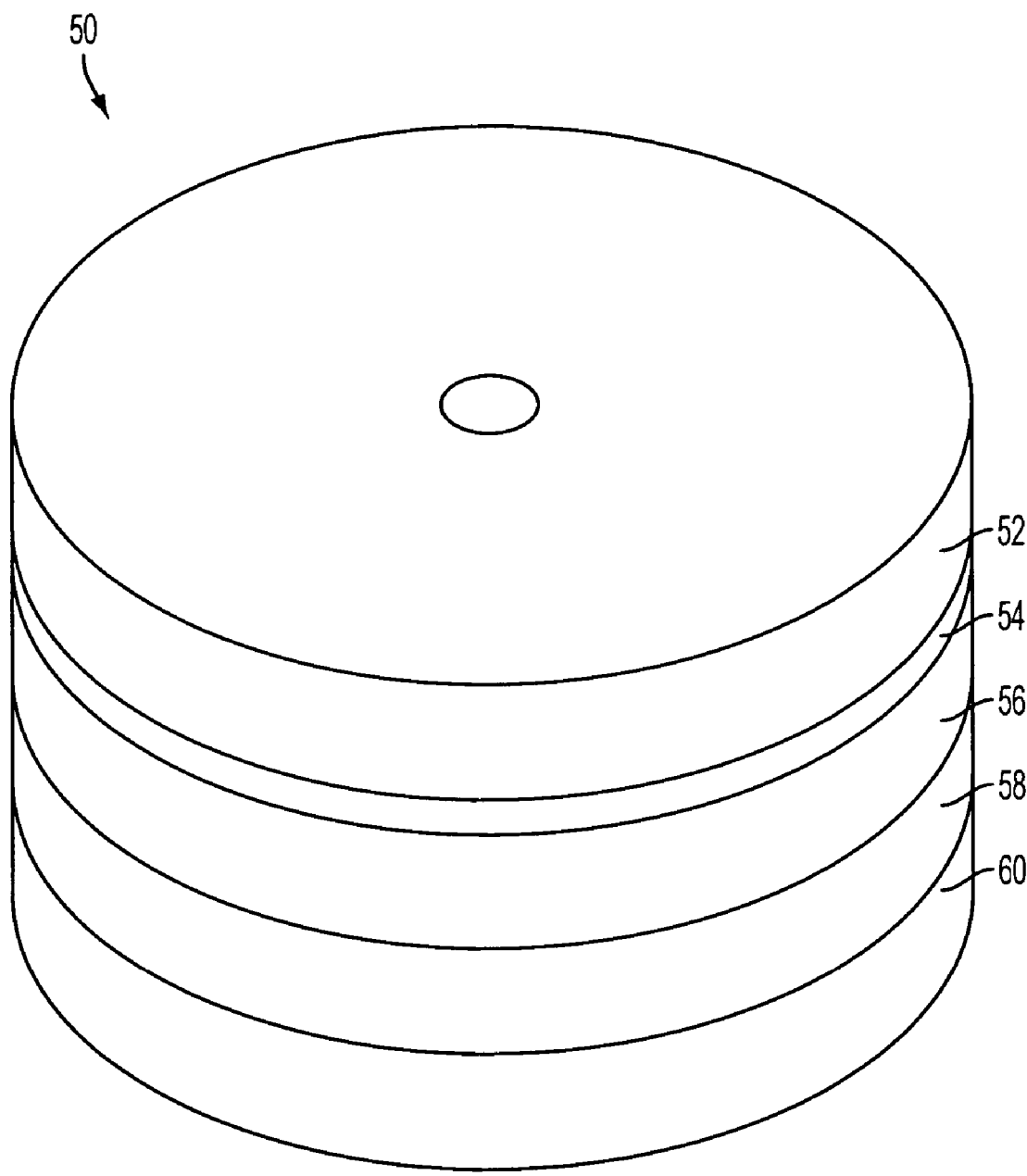
FIG. 3 is a perspective view of a data storage medium in accordance with an embodiment of the invention.

With reference to FIG. 3, an archival storage medium in the form of a memory disk 50 according to an exemplary embodiment of the invention is shown having a carrier wafer or substrate 60, over which is deposited a dielectric layer 58, for example an oxide layer. Although the invention is illustrated in the form of a disk in the exemplary embodiment, it may take other forms as well, for example, an optical card or other arrangement. The carrier wafer or substrate 60 can comprise a polycarbonate material, and the dielectric layer 58 can comprise a silicon dioxide layer, for example, or another dielectric layer. An underlying material layer 56 is formed over the dielectric layer 58. The underlying material layer 56 can comprise any of the underlying materials listed above. In accordance with the invention, a thin noble metal layer 54 is deposited, by evaporation, for example, onto the underlying material layer 56. Conventional techniques may be used to form the layers, and are well known to one skilled in the art. The noble metal layer 54 is thereafter preferably covered with a protective transparent layer 52. The protective layer 52 can be a dielectric layer, for example, an oxide layer, which can comprise a silicon dioxide layer. The protective layer 52 can be another passivating material which has an adequate degree of transmission for the wavelength of a laser beam chosen to write data. In a preferred embodiment, the protective layer 52 is a transparent oxide layer so that the noble metal layer 54 retains its reflective properties. A protected noble metal layer 54 combines the natural optical and spectral performance of noble metal together with the durability of hard dielectrics. In addition, coated noble metals can be cleaned regularly using standard organic solvents, such as alcohol or acetone.

Referring again to FIG. 3, the noble metal layer 54 can be deposited to a thickness of approximately a few 100 Å. The noble metal layer 54 can be deposited by evaporation, for example. In a preferred embodiment, the noble metal layer 54 has a thickness of approximately 50 Å to approximately 300 Å. The thickness of the underlying material layer 56 is preferably several times greater than the thickness of the noble metal layer 54. In a preferred embodiment, the thickness of the underlying material layer 56 is approximately 200 Å to approximately 2000 Å. The thickness of the protective dielectric layer 52 is approximately 300 Å to approximately 1000 Å.

Figure 3A:
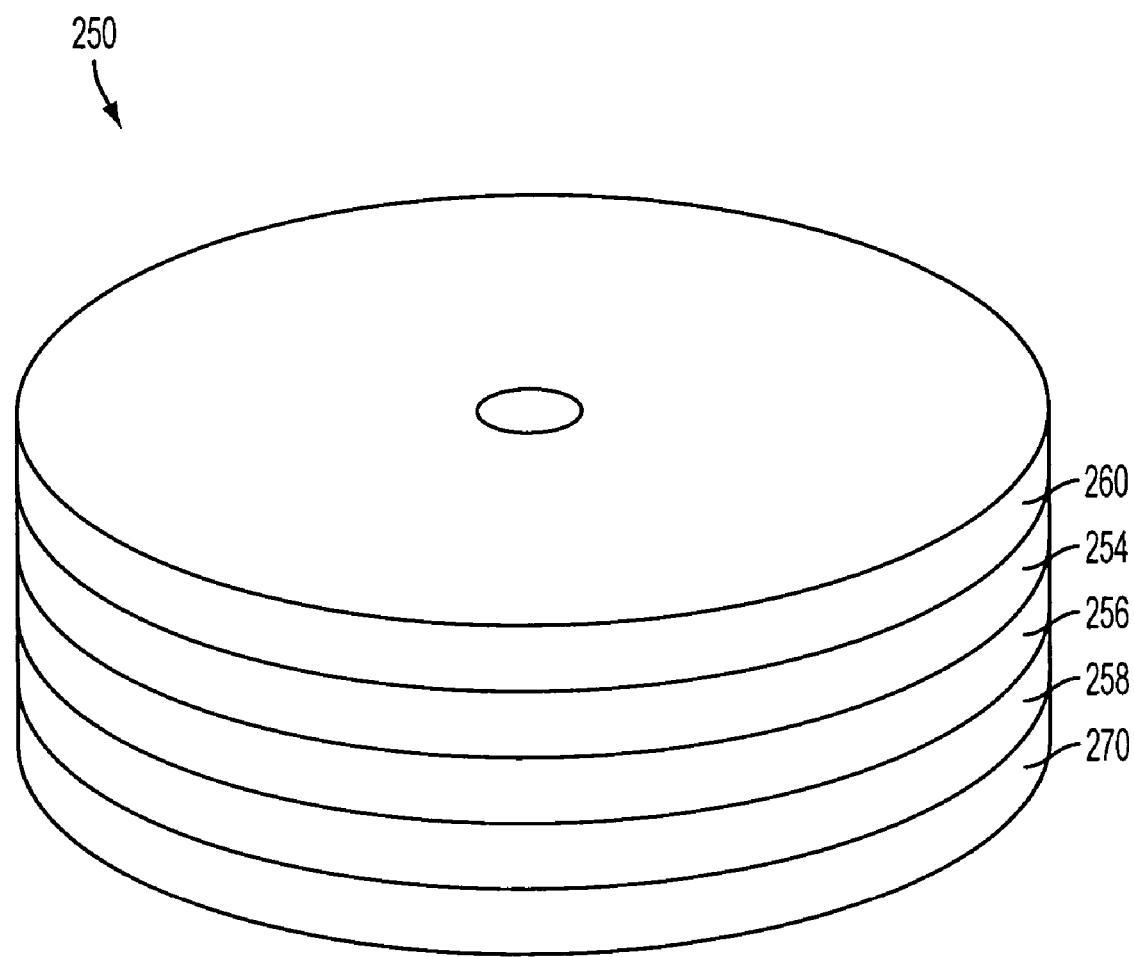
FIG. 3A is a perspective view of a data storage medium in accordance with another embodiment of the invention.
Figure 3B:
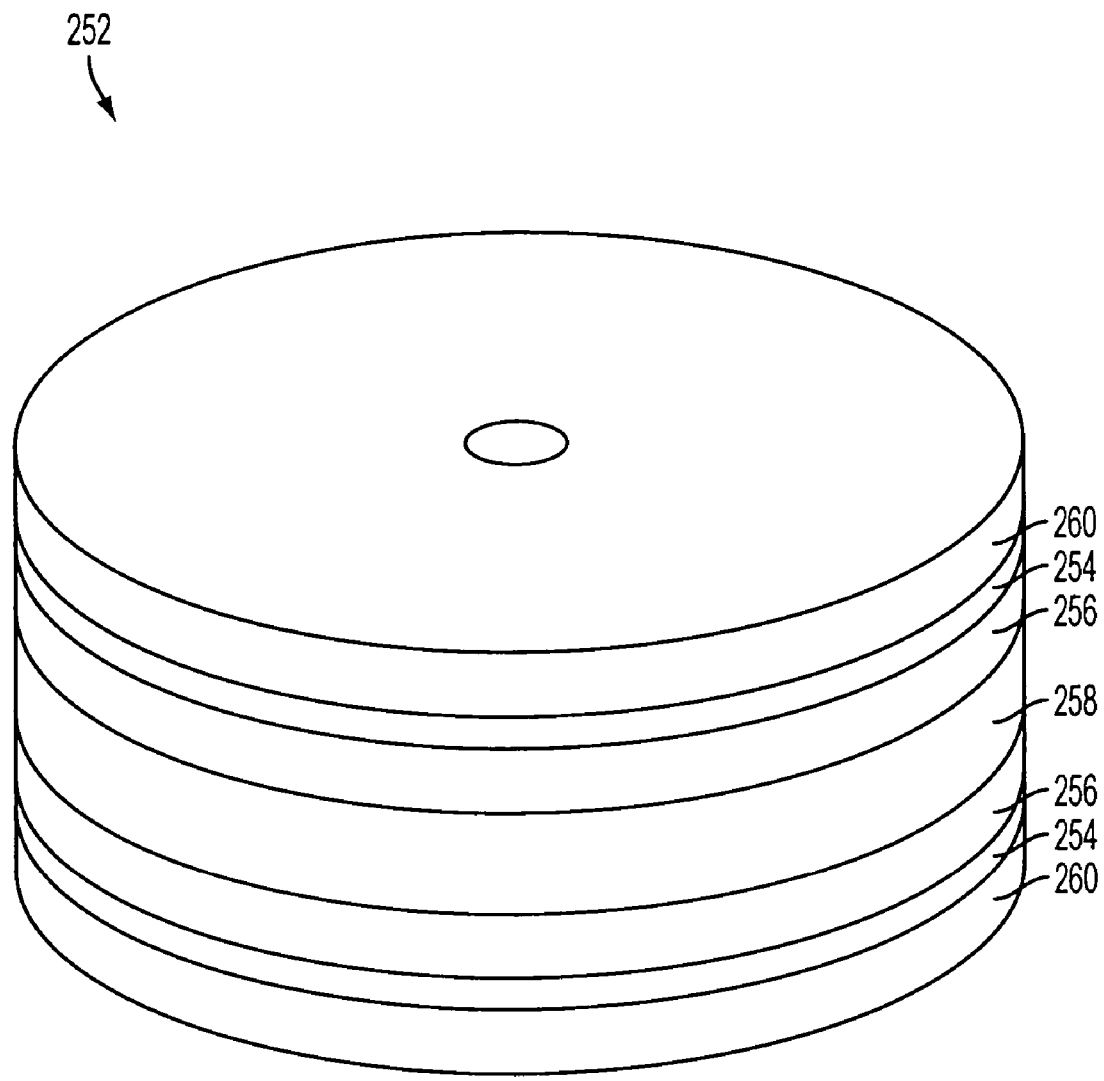
FIG. 3B is a perspective view of a data storage medium in accordance with another embodiment of the invention.

The archival storage medium according to the invention can have other constructions. For example, although FIG. 3 shows a storage medium with a recordable layer—noble metal layer 54—next to the protective layer 52, in conventional art the recordable layer is typically formed next to a substrate. The invention is equally applicable to such a conventional configuration. With reference to FIG. 3A of the invention, a storage medium 250 has a substrate 260 on top of a noble metal layer 254. The substrate 260 can comprise a polycarbonate material. A thin adhesive layer (not shown) may be deposited between the substrate 260 and the noble metal layer 254 to promote adhesion of the noble metal layer 254 to the substrate 260, or a surface of the noble metal layer 254 may be activated with a plasma to promote adhesion. An underlying material layer 256 is disposed underneath the noble metal layer 254. The storage medium 250 also comprises a dielectric layer 258 and a label layer 270. Alternatively, the storage medium can be a double-sided storage medium, as shown in FIG. 3B, wherein the storage medium 252 is recordable on both sides because it has two noble metal layers 254 and two underlying material layers 256, one set on each side of the medium 252.

Figure 4:
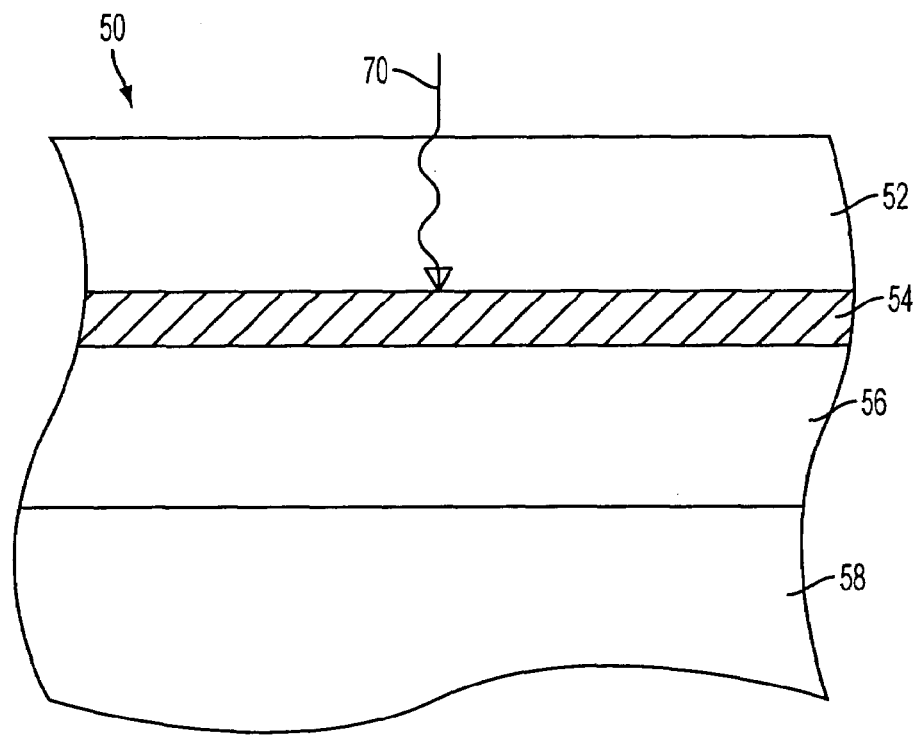
FIG. 4 is a partial side-sectional view of the data storage medium of FIG. 3 during a write operation.

As discussed above, data is written to the data storage medium, e.g., a storage disk, using a laser beam. With reference to FIG. 4 and the storage medium of FIG. 3, a laser beam 70 irradiated onto disk 50 passes through the protective layer 52, and heats the noble metal layer 54 and the underlying material layer 56. In the embodiments shown in FIGS. 3A and 3B, the irradiated laser beam 70 passes through the substrate 260 and heats the noble metal layer 254 and the underlying material layer 256. Hereinafter, for the sake of brevity, the invention is described with reference to the embodiment of FIG. 3 although the description is similarly applicable to the embodiments of FIGS. 3A and 3B. The light of the laser beam 70 has a wavelength, 405 nm to 480 nm, for example, such that it is not significantly absorbed by the protective layer 52 (or substrate 260) so the laser beam 70 maintains its energy as it passes through the protective layer 52, and reaches the noble metal layer 54. The noble metal layer 54 absorbs the energy from the laser beam 70, and the heat from the laser beam 70 causes the noble metal layer 54 to melt and diffuse into the underlying material layer 56.

Figure 5:
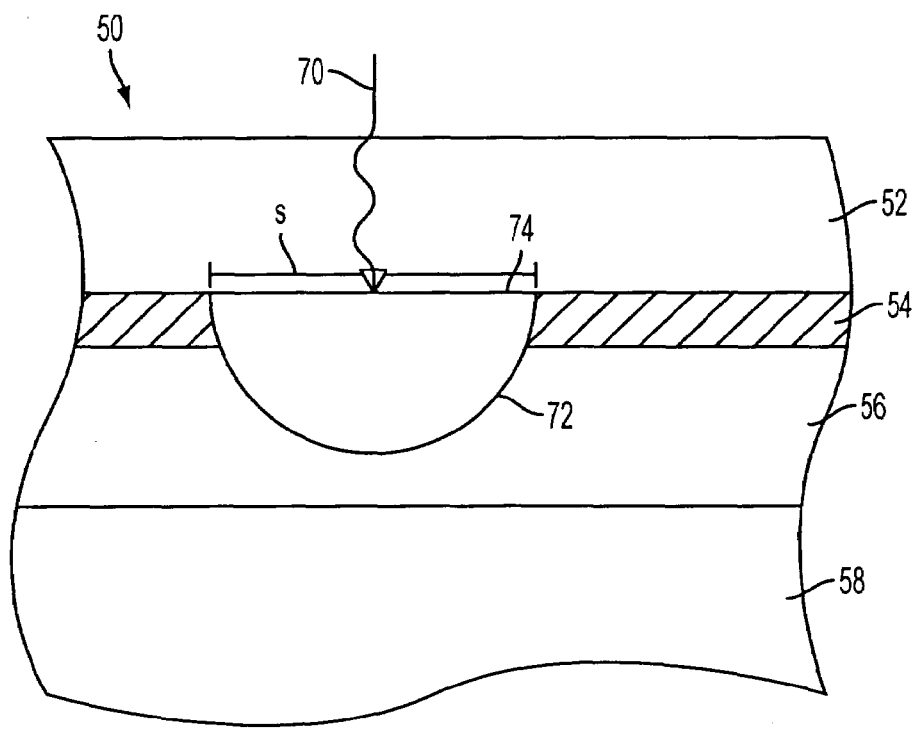
FIG. 5 is a partial side-sectional view of the data storage medium of FIG. 3 during a write operation.

As a result, with reference to FIG. 5, a molten region 72 is formed in the medium 50. The molten region 72 comprises a mixture of materials from the melted noble metal layer 54 and underlying material layer 56. In particular, the top surface 74 of the molten region 72 comprises a mixture of materials from the noble metal layer 54 and underlying material layer 56.

After the exposure of the laser beam 70 on the molten region 72 is stopped, the molten region 72 cools and becomes a solid mixture region comprising inter-metallic compounds and/or materials from the noble metal layer 54 and underlying material layer 56. The solid mixture regions are not as reflective as areas of the noble metal layer 54 that were not melted. The difference in reflectance can be detected by a laser during a read operation that has a lower energy than the laser that writes data onto the data storage medium. It has been determined by the inventors that for maximum change in reflectance, which is desirable for data storage, the molten region 72 should contain approximately equal atomic volumes of the underlying material 56 and the noble metal 54. In accordance with the invention, the molten region 72 may contain more or less of the underlying material 56, by atomic volume with respect to the atomic volume of the noble metal layer 54, with good results. This is achieved by forming the underlying material layer 56 thicker than the noble metal layer 54, as discussed above, and by supplying energy sufficient to melt not only the noble metal layer 54, but also the underlying material layer 56, as discussed below.

An exemplary laser for the above-described write operation is a blue laser, having a wavelength of 405 nm to 480 nm. Such a laser works best for highest density data storage. The blue laser produces more transmittance and absorption of the light (or not as much reflectance) than other lasers when irradiated onto the noble metal layer 54. Advantageously, however, the blue laser produces most absorption of the light by the underlying material layer 56, which is desirable because it allows for low reflectance from surface regions comprising, at least in part, the underlying material layer 56 and the noble metal layer 54.

Thermal design considerations of the disk 50 are now discussed. During writing of data to the disk 50, the energy of the laser beam 70 is absorbed by a small area of the noble metal layer 54 and underlying material layer 56, thereby producing the molten region 72, as discussed above. The range of the laser beam's high temperature penetration into the disk 50, and thereby the size of the molten region 72, can be determined by the heat capacity of the layers of the disk 50. The temperature reached by the top layer of the disk 50, when exposed to a laser beam, is dependent upon three fundamental factors: the amount of energy per unit area that is introduced; the rate at which the energy is introduced; and the heat capacity and heat conductivity of the underlying material. The greater the thermal conductivity (or lower thermal resistance) of the underlying layer, the lower the temperature will be at the top layer. Conversely, the lower the thermal conductivity (or higher the thermal resistance) of the underlying material, the higher the temperature will be on the top surface.

In accordance with principles of the invention, a laser beam 70 having a short duration, on the order of 0.5 to 5 nanoseconds, for example, is used to melt the noble metal layer 54 and underlying material layer 56. For a short duration of a laser beam 70, the heating rate is determined primarily by the energy supplied by the laser beam 70, as discussed below. The heat capacity of the disk 50 can be modeled using an equivalent electrical circuit model. Approximation of thermal models with electrical circuits is well known, and is not explained in detail herein.

Figure 6:
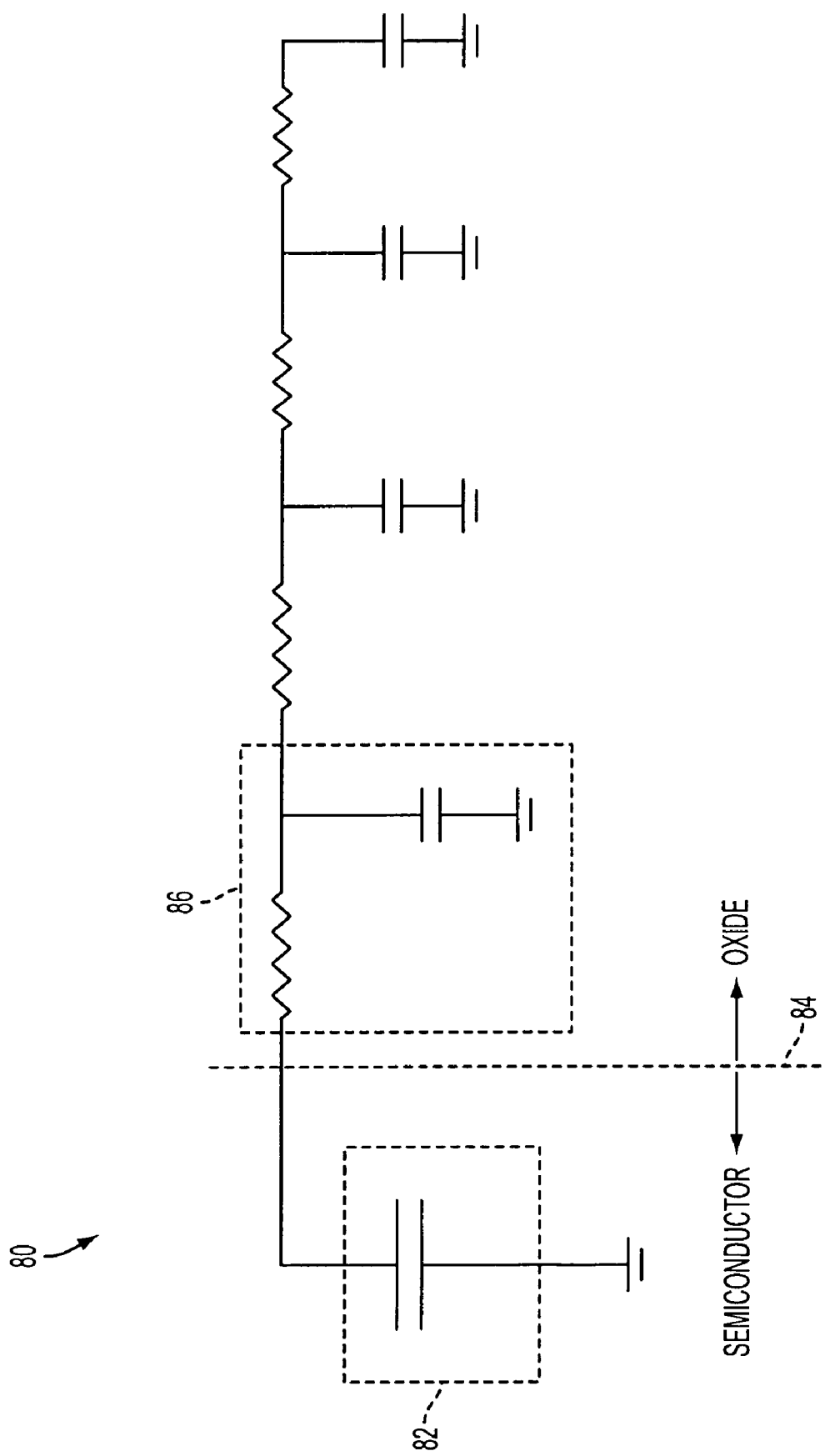
FIG. 6 shows an equivalent electrical circuit for the data storage medium of FIG. 3.

An exemplary equivalent electrical circuit 80 of the disk 50 is shown in FIG. 6. On the left side of dashed line 84 is the electrical circuit representation 82 of the underlying material layer 56. To the right of dashed line 84, the dielectric layer 58 used in the preferred embodiment is represented by a series of electrical components, and a unit length of the dielectric layer—1 micron for example—is represented by electrical circuit 86. In the equivalent electrical circuit 80, temperature is analogous to voltage, and the rate of change in temperature, or heat flux, is analogous to current. The heat dissipation is dependent upon the thermal conductivity of each layer of the disk 50.

If the heat dissipation for each layer on a disk 50 is known, the amount of heat required to raise the temperature of the noble metal layer 54 and the underlying material layer 56 to the point where the noble metal layer 54 and the underlying material layer 56 will melt can be determined. If a short duration laser beam 70 is applied to the disk 50, the temperature change will be determined mostly by the heat capacity of the molten region 72, in which the energy of the laser beam 70 is absorbed. An equivalent circuit representation can be made for the total amount of heat transferred to the molten region 72. The total amount of heat transferred into the molten region 72 can be represented as follows:

$$C = C_p \rho s^2 t \text{ units: J/}° \text{K} \tag{1}$$

In equation (1), C is the total amount of heat transferred, $C_p$ is the heat capacity of the underlying material layer 56, $\rho$ is the density of the underlying material layer 56, $s^2$ is the surface area of the spot irradiated by the laser beam 70, and t represents the thickness of the semiconductor layer 56. The units are Joules (J) per degree Kelvin (K). This equation can be used to estimate the energy of the laser beam 70 required to melt the noble metal layer 54 and the underlying semiconductor layer 56, and create the molten region 72 of the noble metal and underlying material.

In an exemplary embodiment, a 1 nano-second long 0.65 milli-Watt laser pulse, having a wavelength of approximately 405 nm to 480 nm, may be used to irradiate the noble metal layer 54. Such a laser pulse delivers an energy, $\Delta E$, of 650 femtojoules to the surface of the noble metal layer 54 to create the molten region 72. For example, if the size of the molten region 72 is about 0.1 $\mu m^3$, and assuming that the underlying material layer 56 is a silicon layer having a heat capacity of 1.63 J/° K cm$^3$, the temperature change in the noble metal layer 54 and underlying material layer 56 can be represented by the following equation:

$$\Delta T = \Delta E / (C_p \rho s^2 t) = 400° \text{ C}. \tag{2}$$

Figure 7:
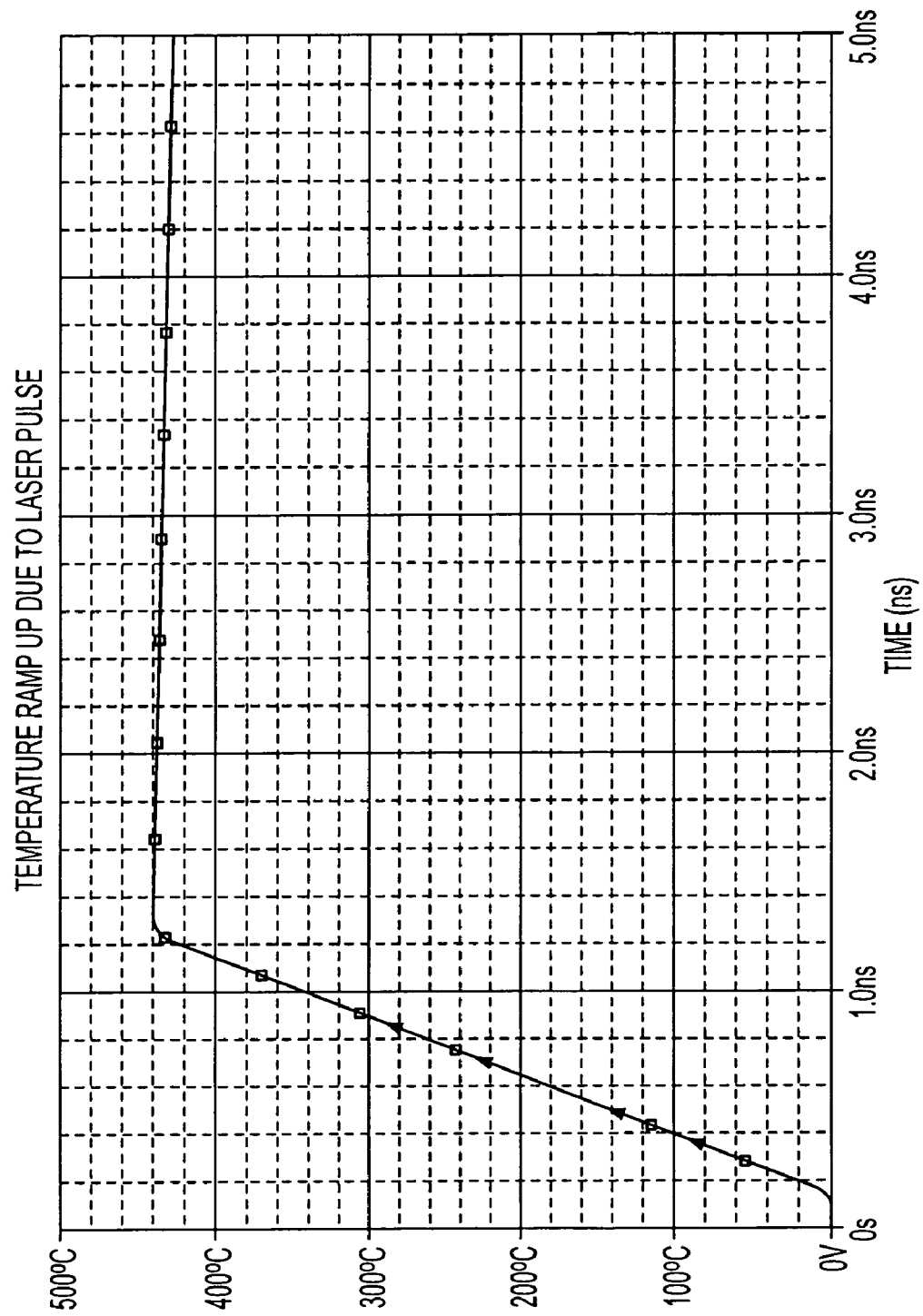
FIG. 7 is a graph of temperature versus time during a write operation.

In FIG. 7, the temperature ramp up of the noble metal layer 54 and underlying material layer 56, which turn into the molten region 72, is shown. Using the parameters discussed above with respect to equation (2), the molten region 72 reaches over 400° C. after about 1 nanosecond. The time duration of the laser pulse can be adjusted to increase the beam's penetration of the noble metal layer 54 into the underlying material layer 56. The time duration of the laser pulse may be increased, for example, if the amount of energy delivered by the laser pulse is insufficient to melt the noble metal layer 54. If the amount of energy is more than sufficient to the melt the noble metal layer 54, then the duration of the laser pulse may be reduced to increase the speed of the writing process, i.e., the laser pulse may be applied to a different location on the disk 50 in a quicker manner. Lower laser powers may require longer temperature ramp-up times.

Cooling of the molten region 72 is now discussed with reference to FIG. 3. Cooling of the molten region 72 is accomplished primarily via heat dissipation into layers of the disk 50 that are underneath the noble metal layer 54. Both the heat capacity and the thermal conductivity of the materials underneath the molten region 72 are determining factors of the rate of cooling. In a preferred embodiment, the underlying material layer 56 is formed over dielectric layer 58 comprising a silicon dioxide layer, which has moderate heat capacity and high thermal resistance. The heat capacity of the oxide layer 58 is about the same as that of the underlying material layer 56, if the underlying material layer is a silicon or germanium layer. The thermal conductivity of the oxide layer 58 is about one hundred times lower than the underlying material layer 56, if it is a silicon or germanium underlying layer 56.

Figure 8:
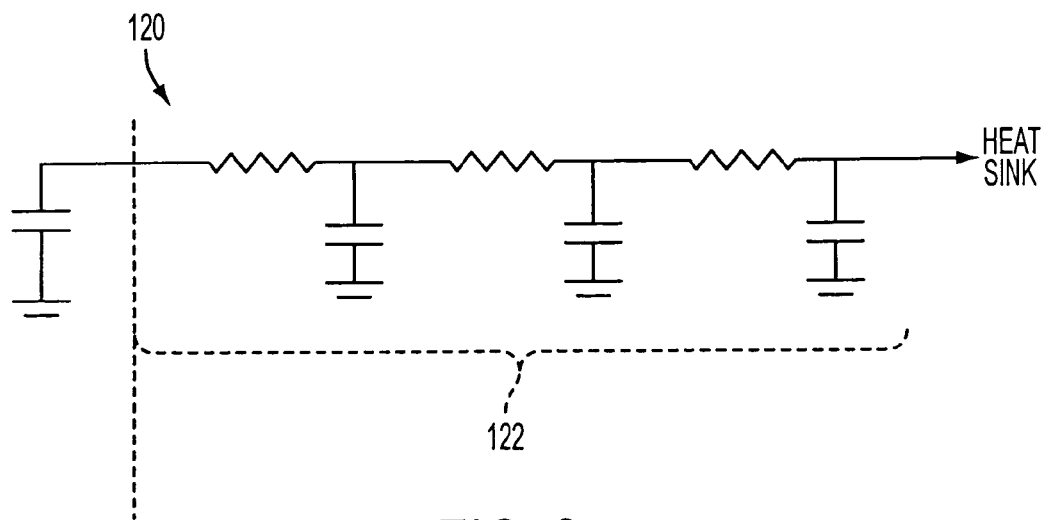
FIG. 8 shows an equivalent electrical circuit for the data storage medium of FIG. 3.
Figure 9:
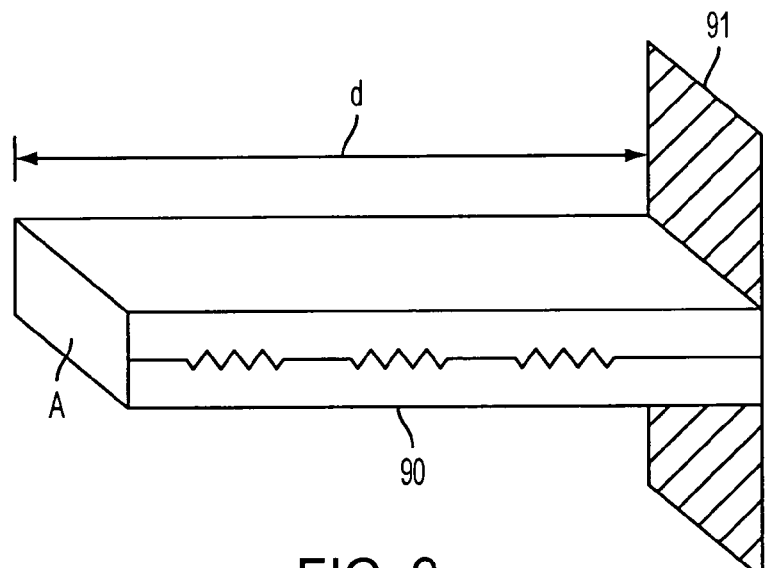
FIG. 9 shows a partial representation of a layer of the data storage medium of FIG. 3.
Figure 10:
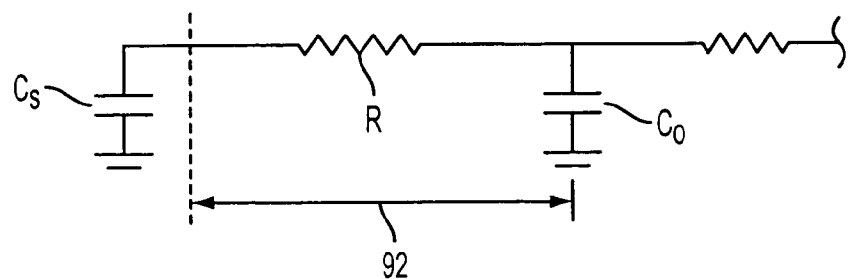
FIG. 10 shows a partial equivalent electrical circuit of the circuit of FIG. 3.

The rate of cooling, or quenching, of the molten region 72 can be determined by an equivalent electrical circuit representation of heat conduction, as shown in FIGS. 8-10. FIG. 8 shows an equivalent circuit 120 having a series of electrical components 122 representing the thermal properties of the dielectric layer 58. In the equivalent electrical circuit 120, temperature is analogous to voltage and heat flux analogous to current. In FIG. 9, a wedge 90 is shown, which is a slice of the dielectric layer 58 having a depth d and a cross-sectional area A. The wedge 90 terminates at a heat sink 91. The time invariant steady state solution for the wedge 90 of the dielectric layer 58, terminated by a heat sink 91 with an infinite heat capacity, is a linear variation in temperature, where the thermal resistance of the sample is:

$$R = d/(KA) \text{ units: } ° \text{K/W} \tag{3}$$

In the above equation, d is the depth of the wedge 90 (as seen in FIG. 9), K is the heat conductivity of the dielectric layer 58, and A is the cross-sectional area of the wedge 90. For a silicon dioxide dielectric layer 58, the heat conductivity K=0.014 J/(sec·cm·° K). The rate of cooling is then determined by the R·C time constant of the equivalent electrical circuit. The R·C time constant is, generally, the time required for half of the heat to dissipate, or, in terms of the present invention, the time required for the $\Delta T$ to be reduced by 50%.

FIG. 10 shows a portion of the equivalent electrical circuit 120 of FIG. 8. In the portion of the equivalent electrical circuit shown in FIG. 10, the numeral 92 represents a 0.1 $\mu m$ segment of the dielectric layer 58. Each 0.1 $\mu m$ segment 92 of the dielectric layer 58 is represented by its thermal resistance R and heat capacity $C_o$. FIG. 10 also shows the heat capacity $C_s$ of the underlying material layer 56. In a simple model, the resistance R of the first segment of the oxide layer is $7 \times 10^7$ ° K/W, and its thermal capacity is $1.6 \times 10^{-15}$ J/° K. According to these parameters, the R·C time constant is $(7 \times 10^7 ° \text{K/W})$ $(1.6 \times 10^{-15} \text{ J/° K})$, or approximately 100 nanoseconds. Thus, the exemplary embodiment, $\Delta T$ will be reduced by 50%—from 400° C. to 200° C., in 100 nanoseconds.

Figure 11:
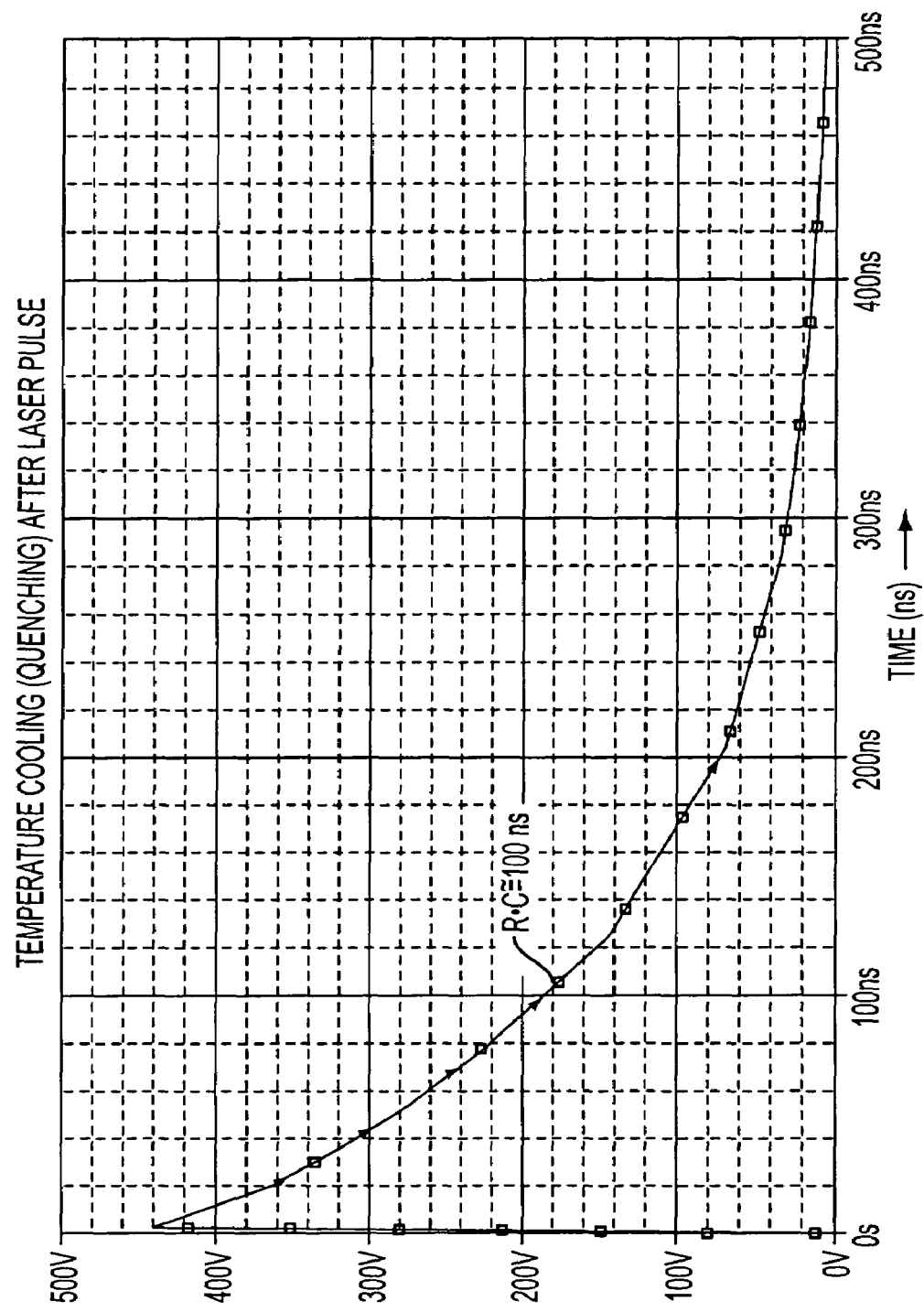
FIG. 11 is a graph of temperature versus time during cooling.

FIG. 11 is a graph showing the rate of cooling after the laser pulse is no longer irradiated onto the molten region 72. As discussed above, the time constant R·C of cooling in the equivalent electrical circuit simulation is approximately 100 nanoseconds. It has been found that such rapid cooling may result in the molten region 72 forming a meta-stable mixture, which is discussed below.

Figure 12:
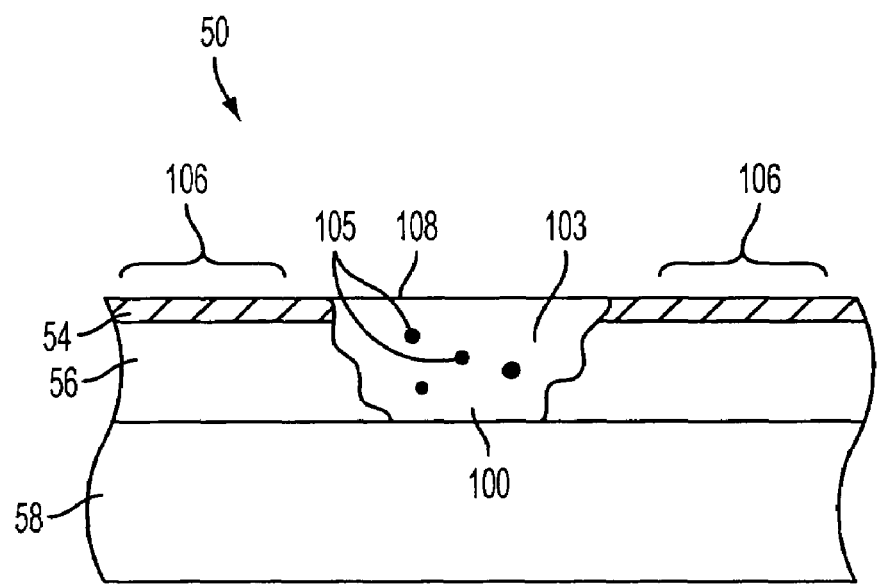
FIG. 12 shows a partial side-sectional view of the data storage medium of FIG. 3 after a write operation.
Figure 13:
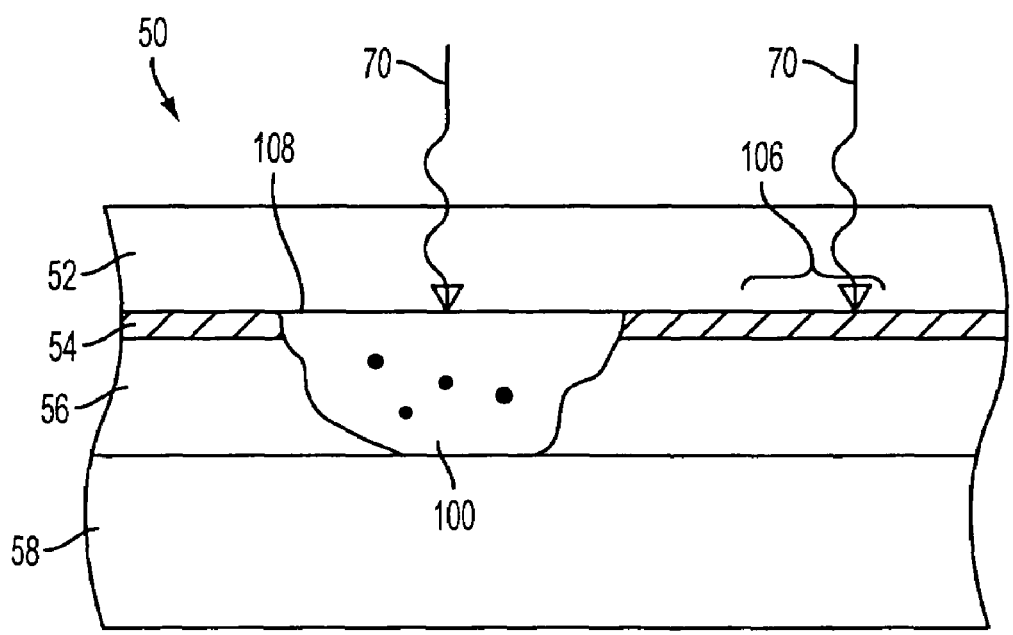
FIG. 13 shows a partial side-sectional view of the data storage medium of FIG. 3 after a write operation.

With reference to FIGS. 12 and 13, a read operation for the disk 50 is now described. As discussed above, heating above the melting temperature causes the formation of a molten mixture comprising the noble metal layer 54 and the underlying material layer 56. Upon cooling or quenching, the noble metal layer 54 and the underlying material layer 56 separate into a two-component solid material, where first component is usually an inter-metallic compound. The second component can be either the underlying material or the noble metal, depending upon the amount of the underlying material that has been melted. If more underlying material melts than can combine with the melted noble metal to form an inter-metallic compound, then the second material comprises the underlying material. If more noble metal melts than can combine with the melted underlying material to form an inter-metallic compound, then the second material comprises the noble metal. Alternatively, if ideal proportions of the noble metal and the underlying material are melted, only an inter-metallic compound remains. If the underlying material is Silicon or Germanium, then the cooled portion comprises an inter-metallic compound and a second component as discussed above.

After being melted and cooled, the noble metal layer 54 no longer comprises the entirety of the upper surface of the molten region 72. As a result, there is a large change in the reflectance between the areas irradiated by the laser beam 70, and other areas where the gold film 54 was not heated by the laser beam. In FIGS. 12 and 13, numeral 100 represents molten region 72 after it has been cooled or quenched. The cooled region 100 comprises the inter-metallic compound 103, and may comprise a second material 105, as discussed above. If the underlying material is a semiconductor, the cooled region 100 comprises a mixture of an inter-metallic compound and a second component as discussed above. FIGS. 12 and 13 also show areas 106 where the noble metal layer 54, unexposed to the laser beam during the write operation discussed above, has not been melted and still has a high reflectance.

Data is read by observing the reflection at the surface of a disk of a low power laser beam, on the order of 100 micro-Watts or less, or approximately one third of the write power, for example. Where the noble metal layer 54 has diffused into the underlying material layer 56, the reflectance of the laser beam is reduced due to significant absorption or scattering of the laser beam on the top surface 108 of the cooled region 100 (FIGS. 12 and 13). This is because the top surface 108 is now comprised, in substantial part, of the inter-metallic compound. During a read operation, the high reflectance of areas 106 of noble metal layer 54 is easily distinguished from the low reflectance of the top surface 108 of the cooled region 100.

A low power red laser having a wavelength of 650 nm—a wavelength where the reflectivity of noble metals is very high—can be used. The blue (or blue-violet) laser used for the write operation can also be used for the read operation, but at a lower power, on the order of 100 micro-Watts or less, or one third of the write power, for example. While the reflectivity of gold is not high at the wavelength of a low power blue laser, the read operation needs only to distinguish between the presence and absence of gold and can be accomplished using blue laser light.

Combinations of one material for the noble metal layer and one material for the underlying layer are chosen from the groups of materials discussed above. It is desirable that, after the noble metal 54 diffuses into the underlying layer 56, a thermodynamically stable compound is formed. Combinations of the noble metal 54 and underlying layer 56 are chosen to form stable inter-metallic compounds. An inter-metallic compound is an intermediate phase in an alloy system having a narrow range of homogeneity and relatively simple stoichiometric proportions.

Figure 14:
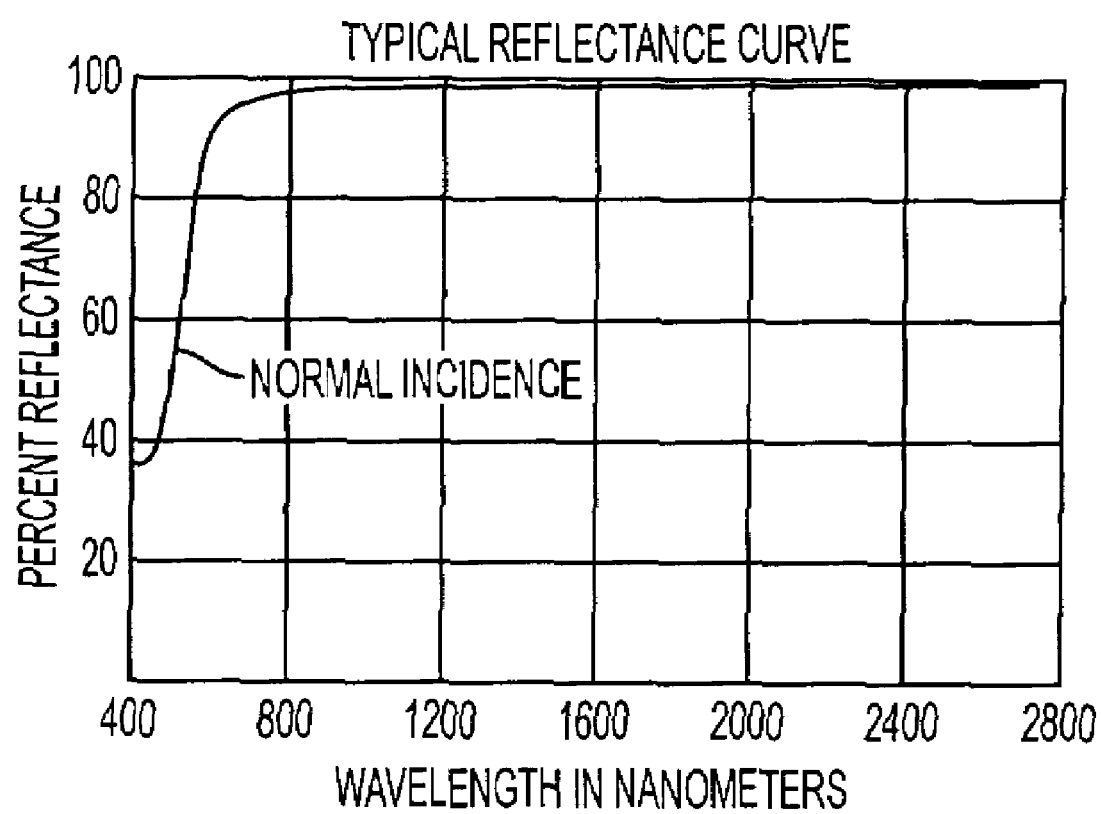
FIG. 14 is a graph showing optical properties of gold.

Although all of the combinations of the above-listed noble metals and underlying layer materials are satisfactory for the purposes of the invention, certain combinations have been found to be preferable. For the noble metal, Au (gold) and Os (osmium) are preferable. For example, gold has desirable properties for long term archival stability, for it combines good tarnish resistance with consistently high reflectance throughout the near, middle, and far infrared light wavelengths. In FIG. 14, a graph of pure gold's reflectance versus wavelength in nanometers is shown. Pure gold provides over 96% average reflectance from 650 nm to 1700 nm, and over 98% average reflectance 2000 nm to 1600 nm. In addition to its good optical properties, gold is also effective in controlling thermal radiation.

For the underlying material, characteristics such as easy deposition and stability are important, in combination with forming a stable compound with the noble metal layer. Preferably, materials for the underlying layer are Ti (titanium) and Zr (zirconium), and also Si (silicon) when the noble metal is Os (osmium). Preferred combinations for a noble metal layer and underlying material layer include: Au (gold) and Ti (titanium); Os (osmium) and Ti (titanium); and Pt (platinum) and Si (silicon). With reference to FIG. 15, desirable combinations of the noble metal layer and underlying material layer are shown. Combinations that have good results, in accordance with the invention, are marked by an "X" in FIG. 15.

The noble metal layer forms a stable inter-metallic compound with the underlying material. The resulting compound will also have a high degree of resistance to oxidation. The compound will have a significantly different reflectivity than the noble metal alone when exposed to a laser light beam—while reflectivity of the compounds will be significantly less that that of the noble metal. For maximum change in reflectance, the molten volume should contain a sufficient amount of the underlying material, so that the entire volume of the noble metal mixes, when heated, with the underlying material. In most cases, substantially equal atomic volumes of the underlying material layer 56 and the noble metal layer 54 will be sufficient for a complete reaction and mixing of the two materials.

Figure 16:
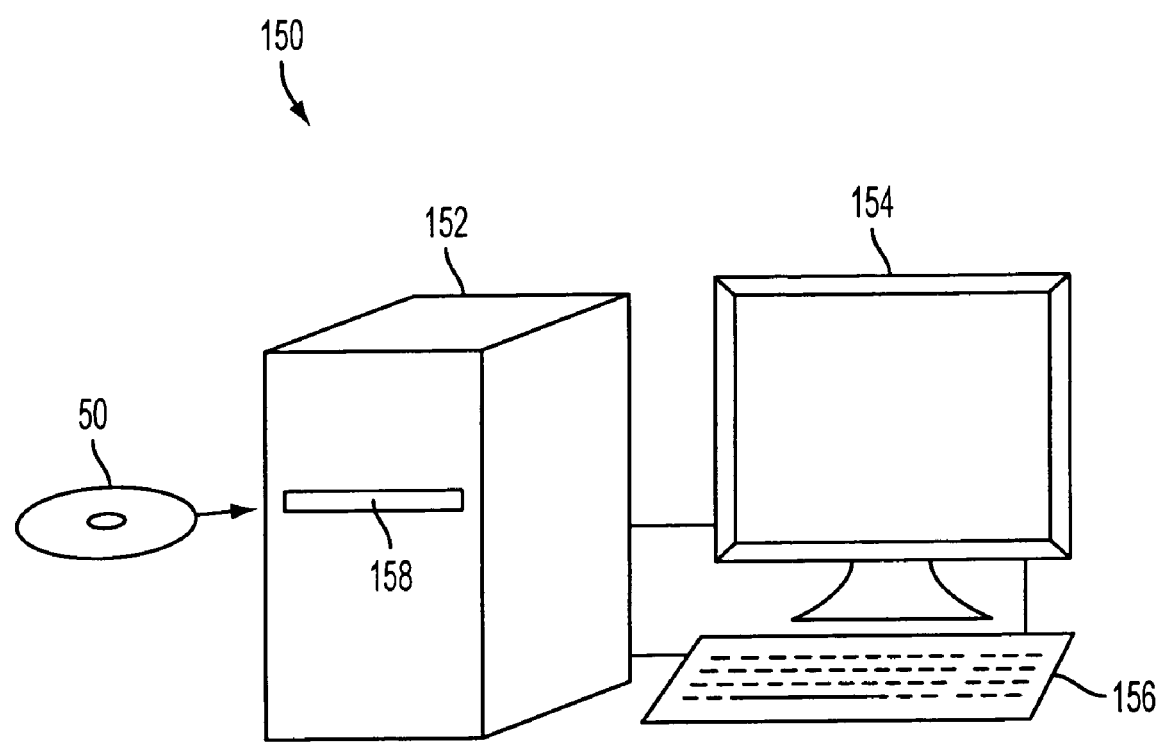
FIG. 16 shows a system for using the data storage medium of FIG. 4.
Figure 17:
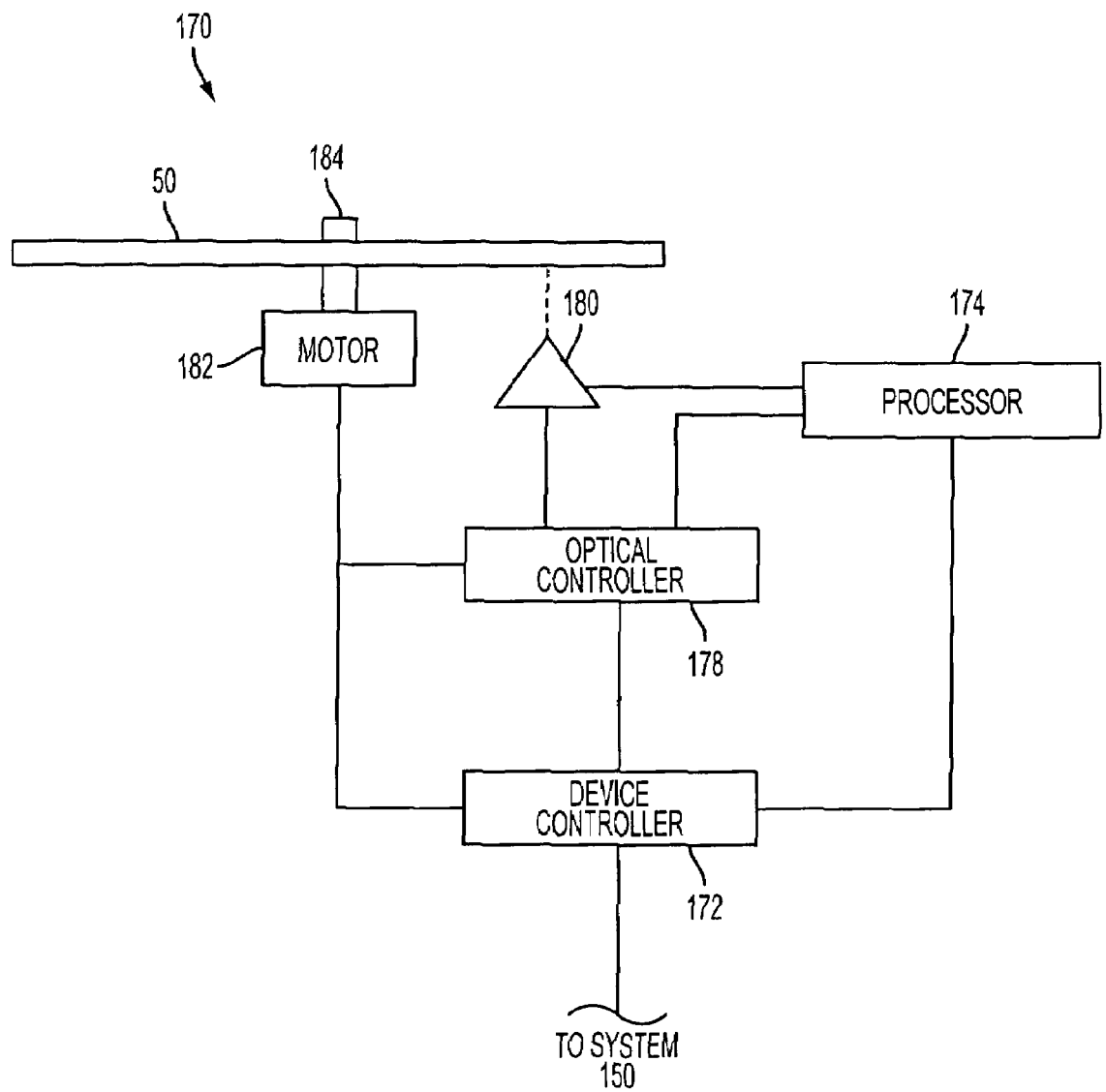
FIG. 17 shows a block diagram of a device for writing and reading from the data storage medium device of FIG. 4.

FIG. 16 shows a system 150 for reading and writing data to disk 50 of the invention. The system 150 may comprise a central unit 152, a visual display 154 and a user interface 156. The disk 50 may be inserted into a slot 158 of the central unit 152. Inside the central unit 152 is a device for reading and writing data to the disk 50 in accordance with the invention. An example of such a device, generally designated by numeral 170, is shown in FIG. 17. The device 170 has a device controller 172, a processor 174, an optical controller 178 and an optical pickup 180. The processor 174 transmits and receives data which has been read from the disk 50 through the optical pickup 180 and data which will be written to the disk 50 through the optical pickup 180. The optical controller 178 controls the optical pickup 180. The device controller 172 controls the overall operation of the device 170. The device 170 also has a motor 182 for rotating a spindle 184 and the disk 50. The device 170 is capable of irradiating the disk 50 with a laser beam to melt the noble metal 54 (FIG. 3) and underlying material 56 (FIG. 3) in order to write data to the disk 50, as discussed above. After data is written to disk 50, the device 170 can also read data from the disk 50 by irradiating a low power laser beam onto the disk 50.

The above discussed embodiments provide desirable results for long-term stability of archival data storage, and improve the maximum density of the recorded data. Archival storage requires long term stability of the materials, and gold is one of the least reactive materials known to mankind. The lifetime of a gold film and a semiconductor layer between two dielectric oxide layers should be essentially infinite. To the outside world the archival memory will look like a noble metal layer full of sub-micron size holes that are not very reflective. The hole/non-hole areas in a track represent data.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the oxide layers may be replaced with glass layers, and the invention can be used with lasers of different wavelengths that expose smaller areas of the noble metal. Also, the noble metal layer can comprise an alloy consisting of more than one noble metal, and the underlying material layer can comprise an alloy consisting of more than one metal. Accordingly, the invention is not to be seen as limited by the foregoing description, but is only limited by the scope of the appended claims.

What is claimed as new and desired to be protected by Letters Patent of the United States is:

1. A data storage medium comprising:
  a first material layer consisting of one of Cr, Hf, Nb, Ta, Ti, Zr and V; and
  a second light reflective material layer consisting of one of Au, Ir, Os, Pd, Pt, Re, Rh and Ru, formed over said first material layer and having a first light reflectance property,
  wherein said first and second material layers have a property that a light beam applied to a region of said second material layer heats said first and second material layers at said region to produce a compound comprising materials from said first and second material layers and a second light reflectance property for said region which is different from said first light reflectance property.

2. The data storage medium of claim 1, wherein said second light reflective material layer has a thickness of about 50 Å to about 300 Å.

3. The data storage medium of claim 1, wherein said first material layer has a thickness of about 200 Å to about 2000 Å.

4. The data storage medium of claim 1, wherein said first light reflectance property is higher than said second light reflectance property.

5. The data storage medium of claim 1, further comprising a dielectric layer under said first material layer.

6. The data storage medium of claim 1, further comprising a protective layer over said second light reflective material layer.

7. The data storage medium of claim 6, wherein said protective layer comprises a silicon dioxide layer formed to a thickness of about 300 Å to about 1000 Å.

8. The data storage medium of claim 1, further comprising a substrate over said second light reflective material layer.

9. The data storage medium of claim 1, wherein said second light reflective material layer consists of Au and said first material layer consists of Ti.

10. The data storage medium of claim 1, wherein said second light reflective material layer consists of Os and said first material layer consists of Ti.

11. The data storage medium of claim 1, wherein said compound is an inter-metallic compound.

12. The data storage medium of claim 1, wherein said medium is an optical disk.

13. The data storage medium of claim 1, wherein said medium has a first side and a second side, and wherein a layer of said second light reflective material layer is formed at said first side and said second side.

14. A data storage medium comprising:
  a first dielectric layer;
  an underlying material layer formed over said first dielectric layer consisting of one of Cr, Hf, Nb, Ta, Ti, Zr and V;
  a noble metal layer consisting of one of Au, Ir, Os, Pd, Pt, Re, Rh and Ru, formed over said underlying material layer; and
  a mixed material portion in said noble metal layer and said underlying material layer, said mixed material portion comprising said noble metal layer and said underlying material layer.

15. The data storage medium of claim 14, wherein said noble metal layer is formed to a thickness of about 50 Å to about 300 Å.

16. The data storage medium of claim 14, wherein said underlying material layer is formed to a thickness of about 200 Å to about 2000 Å.

17. The data storage medium of claim 14, wherein said mixed material portion has a first reflectance value and said noble metal layer has a second reflectance value higher than said first reflectance value.

18. The data storage medium of claim 14, wherein said first dielectric layer has a first thermal conductivity and said underlying material layer has a second thermal conductivity higher than said first thermal conductivity.

19. The data storage medium of claim 14, wherein said first dielectric layer comprises a silicon dioxide layer.

20. The data storage medium of claim 14, further comprising a second dielectric layer over said noble metal layer.

21. The data storage medium of claim 20, wherein said second dielectric layer comprises a silicon dioxide layer.

22. The data storage medium of claim 14, further comprising a substrate over said noble metal layer.

23. The data storage medium of claim 14, wherein said noble metal layer consists of Au and said underlying material layer consists of Ti.

24. The data storage medium of claim 14, wherein said noble metal layer consists of Os and said underlying material layer consists of Ti.

25. The data storage medium of claim 14, wherein said medium mixed material portion is an inter-metallic compound.

26. The data storage medium of claim 14, wherein said medium is an optical disk.

27. The data storage medium of claim 14, wherein said medium has a first side and a second side, and wherein said noble metal layer is formed at said first side and said second side.

28. A data storage medium, comprising:
  a data storage region having higher reflectance regions comprising a noble metal, and adjacent lower reflectance regions comprising a compound formed by said noble metal and an underlying material,
wherein said underlying material consists of one of Cr, Hf, Nb, Ta, Ti, Zr and V, and
wherein said noble metal consists of one of Au, Ir, Os, Pd, Pt, Re, Rh and Ru.

29. The data storage medium according to claim 28, wherein said noble metal consists of Au and said underlying material consists of Ti.

30. The data storage medium according to claim 28, wherein said noble metal consists of Os and said underlying material consists of Ti.

31. The data storage medium according to claim 28, wherein said high reflectance region is between about 50 Å to about 300 Å thick.

32. The data storage medium according to claim 28, further comprising a dielectric layer underneath said underlying material and another dielectric layer over said higher reflectance regions.

33. The data storage medium according to claim 28, further comprising a dielectric layer underneath said underlying material and a substrate over said higher reflectance regions.

34. The data storage medium according to claim 28, wherein said medium is an optical disk.

35. The data storage medium of claim 28, wherein said medium has a first side and a second side, and wherein said higher reflectance regions are formed at said first side and said second side.

36. A system for writing data to a recording medium, comprising:
an optical recording medium comprising a first dielectric layer, an underlying material layer formed over said first dielectric layer, and a noble metal layer formed over said underlying material layer; and
a device for irradiating a laser beam onto the medium, and producing regions in said medium containing a mixture of material from said noble metal layer and said underlying material layer,
wherein said underlying material layer consists of one of Cr, Hf, Nb, Ta, Ti, Zr and V, and
wherein said noble metal layer consists of one of Au, Ir, Os, Pd, Pt, Re, Rh and Ru.

37. The system of claim 36, wherein said laser beam is capable of melting said noble metal layer and said underlying material layer.

38. The system of claim 36, wherein another laser beam is capable of reading written data from said medium.

39. The system of claim 36, wherein said device is capable of detecting a difference in reflectance of said laser beam between said noble metal layer and an area containing a compound of said underlying material layer and said noble metal layer.

40. The system of claim 36, wherein said medium is an optical disk.

41. A method of writing data to a medium, said method comprising the steps of:
providing a disk having a dielectric layer, an underlying material layer over said dielectric layer, and a noble metal layer over said underlying material layer having a predetermined reflectivity; and
irradiating a laser light beam onto said noble metal layer with sufficient energy to diffuse said noble metal layer into said underlying material layer to create an area having a reflectivity lower than said predetermined reflectivity,
wherein said underlying material layer consists of one of Cr, Hf, Nb, Ta, Ti, Zr and V, and
wherein said noble metal layer consists of one of Au, Ir, Os, Pd, Pt, Re, Rh and Ru.

42. The method of claim 41, wherein said act of irradiating said laser light beam comprises raising a temperature of said noble metal layer and said underlying material layer above a melting temperature of said noble metal layer.

43. The method of claim 41, wherein said act of irradiating said laser light beam comprises raising a temperature of said noble metal layer to at least 400° C.

44. The method of claim 41, wherein said act of irradiating said laser light beam comprises irradiating a light beam having a wavelength in the range of 405 nm and 480 nm.

45. The method of claim 41, further comprising cooling said noble metal and said underlying material after said act of irradiating.

46. The method of claim 45, wherein said act of cooling comprises cooling through dissipation of heat into material layers underneath said underlying material layer.

47. The method of claim 46, wherein said material layers underneath said underlying material layer dissipate said heat such that a temperature of said noble metal layer and said underlying material layer is reduced to a temperature below a melting temperature in no longer than approximately 100 nanoseconds.

48. The method of claim 41 wherein said irradiating a laser light beam comprises irradiating a blue light laser beam.

49. A method of changing reflectance on a data storage medium, comprising:
irradiating a laser light beam onto a noble metal layer formed over an underlying material layer to raise a temperature of said noble metal above a melting temperature for a mixture of said noble metal and said underlying material layer, thereby creating a compound from said noble metal and material from said underlying material layer, wherein said underlying material layer consists of one of Cr, Hf, Nb, Ta, Ti, Zr and V, and where said noble metal consists of one of Au, Ir, Os, Pd, Pt, Re, Rh and Ru; and
cooling said mixture.

50. The method of claim 49, wherein said irradiating said laser light beam comprises irradiating a laser beam having a wavelength in the range of approximately 405 nm to approximately 480 nm.

51. The method of claim 49, wherein said irradiating a laser light beam comprises irradiating a blue laser light beam.

* * * * *

UNITED STATES PATENT AND TRADEMARK OFFICE
CERTIFICATE OF CORRECTION

PATENT NO. : 7,541,081 B2  
APPLICATION NO. : 11/190014  
DATED : June 2, 2009  
INVENTOR(S) : Paul A. Farrar et al.

Page 1 of 1

It is certified that error appears in the above-identified patent and that said Letters Patent is hereby corrected as shown below:

In column 12, line 57, in Claim 25, before "mixed" delete "medium".

Signed and Sealed this

Fourth Day of August, 2009

JOHN DOLL  
*Acting Director of the United States Patent and Trademark Office*